(No Model.)

J. R. CRAVEN.
TRUCK FOR CARRYING BRICK PALLETS.

No. 406,885. Patented July 16, 1889.

Witnesses
Ed. Strehli
E. T. Johnson

Inventor
John R. Craven,
By his Attorneys
Strehli & Hill.

UNITED STATES PATENT OFFICE.

JOHN R. CRAVEN, OF CINCINNATI, OHIO.

TRUCK FOR CARRYING BRICK-PALLETS.

SPECIFICATION forming part of Letters Patent No. 406,885, dated July 16, 1889.

Application filed January 28, 1889. Serial No. 297,884. (No model.)

*To all whom it may concern:*

Be it known that I, JOHN R. CRAVEN, a citizen of the United States, and a resident of the city of Cincinnati, in the county of Hamilton and State of Ohio, have invented certain new and useful Improvements in Trucks for Carrying Brick-Pallets, of which the following is a specification.

At present it is customary to carry the bricks in pallets from the machine by which they are molded, or by means of a truck of the ordinary construction. Great time is wasted in carrying the pallets by hand, and the ordinary truck is not of such a construction as to allow the carrying of any considerable number of pallets, as is desirable.

My invention obviates all objections to the method of carrying the pallets now in use, is simple in construction, cheap of manufacture, and efficient in use, enabling one to carry a large number of pallets easily and quickly.

Figure 1:
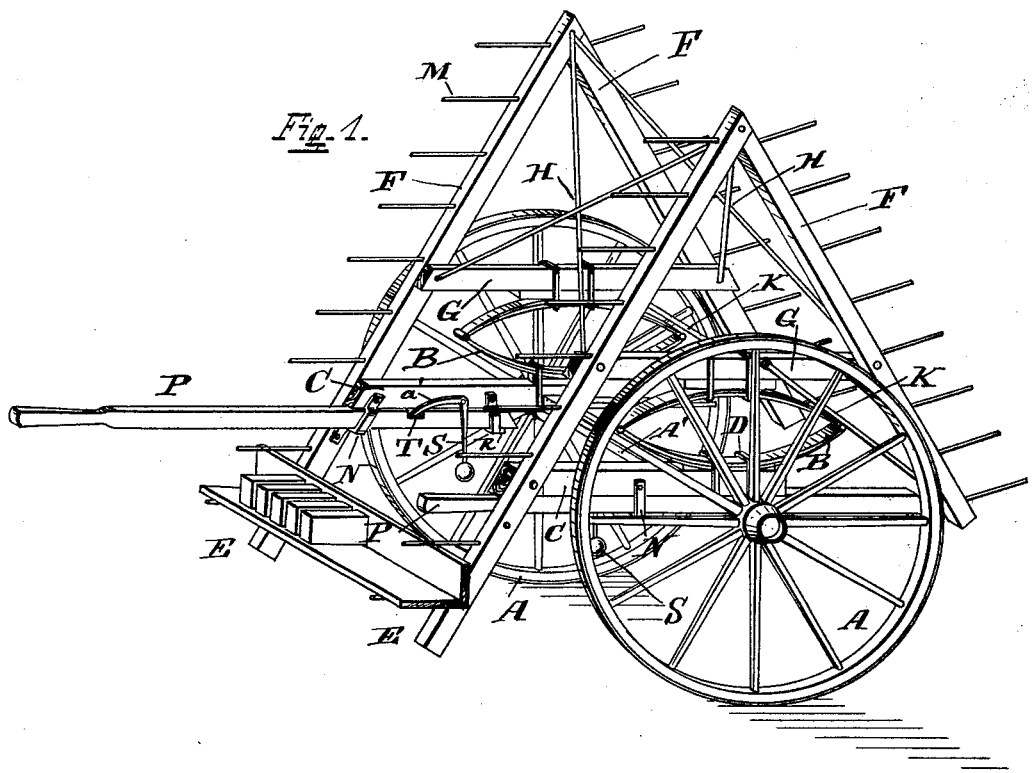
Figure 2:
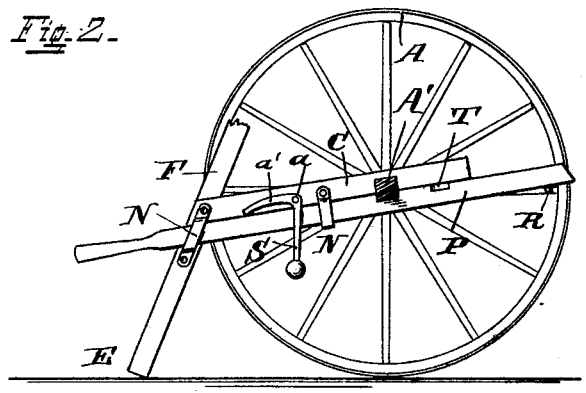

In the accompanying drawings, forming part of this specification, Figure 1 is a perspective view of my improved truck; and Fig. 2, a side view of one of the handles, one connecting-strip, and locking-lever for locking the handles in a certain position, one of the pallet-carrying arms being also shown partly broken away.

The truck is preferably mounted, as shown, on two wheels A A, connected by an axle A' of the ordinary construction. On each side of the truck I provide a spring B, preferably of the form shown. Any other form may, however, be used. These springs B preferably rest on the short connecting-strips C, which strips rest on the axle A', the axle-strips and spring being preferably connected together, as shown, by a clip D.

The pallet-carrying arms are designated by the letters E and F. They are preferably constructed as shown and placed on each side of the machine, meeting and being united at the top and diverging as they extend downward, being connected about midway by the spring-bars G, to which the upper portions of the springs B are attached and connected. These pallet-carrying arms E and F, spring-bars G, and connecting-strips C form a frame-work of an A shape on each side of the truck, and are braced in any convenient manner, preferably by the rods H and K, as shown. This frame-work may, however, be constructed of a U shape or square shape, or of any other suitable shape, and may be braced in any suitable manner.

In the pallet-carrying arms I embed the pins M, on which the pallets containing the bricks are laid, and on which they rest while the truck is being loaded or unloaded and while the truck is carrying the pallets to the proper place in the brick-yard. These pins M may be fastened to the pallet-carrying arms E and F in any suitable manner, and may, when desired, be made adjustable. The pallet-carrying arms E are preferably longer than the pallet-carrying arms F and extend down to form legs or supports for the truck, as shown.

To the connecting-strips G, I preferably rigidly connect the loop-brackets N, as shown. The handles P rest in, are supported by, and slide inward and outward in these loop-brackets N, being prevented from sliding out entirely by a lug R on the end of said handles P. These handles P are made adjustable, so that when the truck is being loaded or unloaded they may be slid in, as shown, out of the way, so that the truck may be loaded or unloaded more readily and conveniently. The means for rendering these handles adjustable may, if desired, be of a construction different from those herein set forth.

S represents a weighted lever pivotally connected at *a* to the connecting-strip G. This lever S is in its normal position when the legs or supports of the truck are resting on the ground—that is to say, when the truck is being loaded or unloaded; but when the truck is lifted or tilted upward by reason of the operator grasping the handles P and lifting them the finger *a'* of the lever S falls into a recess T in the handles P by reason of the lever S tilting, thus locking the handles and preventing them from sliding backward or forward. When the handles are dropped and the truck rests again on the ground, the lever S falls back into its normal position, the fingers *a* rising out of the recess T in the handles P. The handles may then be slid in out of the way. This lever is preferably of the peculiar construction shown. Locking mechanism of a form different from that specifically herein set forth may, however, be employed.

What I claim as new and of my invention, and desire to secure by Letters Patent of the United States, is as follows, viz:

1. In a truck, pallet-carrying arms provided with pins, as M, substantially as set forth.

2. In a truck, pallet-carrying arms having pins, as M, the arms E extending down to form supports for the truck, substantially as set forth.

3. In a truck, arms E and F, having pins, as M, in combination with adjustable handles, substantially as set forth.

4. In a truck, handles, in combination with a locking-lever, as S, substantially as set forth.

5. In a truck, handles P, pieces C, and lever S, in combination with pallet-carrying arms E and F, having pins M, substantially as set forth.

6. In a truck, arms E and F, having pins, as M, spring-bars G, and springs B, substantially as set forth.

7. In a truck, a frame-work provided with pins or projections for carrying the pallets, as specified, mounted on springs, substantially as set forth.

8. In a truck, a suitable frame-work having pins, substantially as set forth, in combination with suitable handles and means for automatically locking and unlocking said handles, substantially as set forth.

JOHN R. CRAVEN.

Witnesses:
JNO. W. STREHLI,
ED. STREHLI.